United States Patent Office 2,937,143
Patented May 17, 1960

2,937,143
PROCESS FOR FLOCCULATING SOLIDS SUSPENDED IN AN AQUEOUS MEDIUM

Mayer B. Goren, Oklahoma City, Okla., assignor to Kerr-McGee Oil Industries, Inc., a corporation of Delaware No Drawing. Application April 5, 1954
Serial No. 421,161

23 Claims. (Cl. 210—52)

This invention relates to a new and improved process for separating solids suspended in aqueous media. More particularly, this invention employs certain specific agents which have been discovered to possess excellent flocculating characteristics in the treatment of, for example, leach liquors containing slimes or other suspensions of solids in aqueous media.

Certain processing steps in ore beneficiation result in the production of large quantities of fines (slimes) through attrition grinding, with a resultant accumulation of ore values in the slimes. The ore is then concentrated through a hydraulic classification of the sands (waste) from the slimes (ore concentrate) and the slimes must in many instances be dewatered for further processing. Settling, filtration, or combinations of these processes are common practice in the treatment of such slimes fractions, and because of the physical nature of the material (fineness) such operations are often slow and costly. The problem of removing slimes or suspensions of solids from solution is not limited to hydrometallurgical or ore processing but occurs in connection with water purification for industrial and municipal use, in ion exchange usage and many industrial solution clarification problems such as in the manufacture of cane sugar.

Recently the practice has been initiated of using chemical flocculating agents in an effort to agglomerate the slimes to afford larger particles which, in a filtration operation, have a lesser tendency to plug the filter medium, or in thickening operations enhance the rate of fall of the slimes particles inasmuch as they have been agglomerated to a larger particle size, and therefore have more of a tendency to settle. Among the commonly used flocculating agents are starches, natural or modified, modified cellulose derivatives such as sodium carboxymethyl cellulose and certain naturally occurring gums extracted from various bean seeds. Glues and gelatin fractions have likewise enjoyed a wide use as flocculants, particularly for filtration operations. These substances find use in neutral or acid medium, but are in general not very effective in an alkaline medium. In addition the synthetic high polymers such as sodium polyacrylate and similar high molecular weight polyanionic electrolytes and some polycationic electrolytes such as polydimethyl-aminoethylacrylate, polydimethylaminomethacrylate and the corresponding diethylamino esters are useful as flocculating agents for clays and slimes fractions. Of the synthetics, the polyanionic materials are useless in solutions of low pH inasmuch as they are rendered insoluble by the acid. They are effective essentially only in a narrow range bordering on pH 7, i.e., in neutral media. The polycationic materials are useful in both acid and neutral media, but are rarely more effective than the less expensive natural soluble protein materials such as glue or gelatin.

The floccing behavior of the modified celluloses and of the natural water-dispersible gums is exceptionally impressive, inasmuch as their use gives rise to large, massive curdy flocs of slimes that settle rapidly and which are not easily redispersed in an advancing and washing treatment. They further appear to exert a highly desirable "squeezing" action on the flocs which forces out entrained liquors and therefore yields a more efficient recovery of values.

The cellulose or gum flocculants may be considered as anionic types by virtue of the lone pairs of electrons on the hydroxyl oxygens of the monosaccharide units, and they probably function as flocculants by coordinating adjacent to positive charges on the surface of the colloidal particle. Because of their polymeric nature and long chained structure, the individual micelles of the dispersed polyelectrolyte or flocculant can serve to link several slime particles together, thereby effecting the agglomeration. The spectacular behavior of the polyelectrolytes may further be related to the fundamental theories of colloidal agglomeration as exemplified in the Hofmeister, or lyotropic series. Thus the coagulating power of a given electrolyte does not vary linearly with the number of charges it carries; instead the coagulating power is much greater for multivalent materials than for an equivalent of an univalent material, the departure from linearity becoming more and more exaggerated as the number of charges is increased.

Unfortunately, and this is particularly true in the treatment of an acid leach pulp, many of the slimes present in the pulp are wholly unaffected or unflocculated by treatment with these anionic polyelectrolytes. For the purpose of discussion we shall refer to these slimes which resist flocculation by cellulose or gum fractions as type II slimes, whereas the slimes which are readily flocculated by these anionic agents will be referred to as type I slimes. Very often there is a preponderance of type II slimes to be found in a leach pulp, with the result that the liquors cannot be readily flocculated and settled. In addition certain aging phenomena have been found to effect a reversal in amenability to flocculating by gums or cellulose derivatives. Thus a freshly prepared pulp may be highly amenable to flocculation by anionic agents, while a small amount of aging will induce such alterations in the nature of the slimes' surfaces that they are no longer coagulated by these reagents. As a consequence when type II slimes are present in quantity, or a reversal in type occurs owing to aging, the effectiveness of the flocculant is markedly reduced and filtration or thickening become beset with all the original difficulties.

It has been found that these type II slimes are amenable to flocculation by cationic agents as the synthetic polyamines described above, or by polyamides such as for example water soluble polyacrylamide, poly N-alkyl acrylamide, or poly N,N-dialkyl acrylamides, the nitrogen of the amine or amide linkage taking on a positive charge either through coordination of a proton, or in the instance of amides through the resonance form:

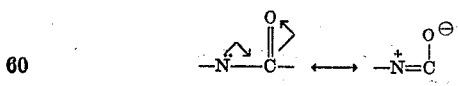

which contributes so much to the actual state of the hybrid. This effect is even further enhanced in acid medium through coordination of a proton on the amide oxygen to give the more stable structure:

The water soluble animal proteins such as glue and gelatin possess the same properties inasmuch as they are polyamide in character, with occasional free amino groups within the chains contributing additional cationic character. These polycationic materials (which are also somewhat polyanionic in nature owing to the electron distribution on the amide oxygens) serve to flocculate both type I and type II slimes. The particles which are formed, however, are quite minute and even though in all respects the slime particles must be considered as flocculated, the flocs are tiny, the settling rates are very slow (although an almost sparkling liquor results) and filtration of a pulp flocculated with a polycationic material is almost as difficult as that of an unflocculated pulp.

When glue or gelatin or a synthetic polycationic flocculant is added to a pulp in admixture with a polyanionic material, the glue, gelatin or synthetic polycationic material imparts unfavorable characteristics to the otherwise massive flocs produced by the polyanionic flocculant when used alone. The flocs produced by the mixture are again tiny, slow settling and slow to filter, although the clarity of the liquor after settling is much improved.

When polycationic flocculants as described above are used alone in a second step to clarify the turbid overflow, which often results from treatment of a pulp with cellulose derivatives or gums, the flocs produced settle to a gelatinous mass of very low pulp density (frequently under 5% solids) which cannot be filtered because the flocs are small enough to pass through an ordinary filter medium, and will plug a finer one.

Accordingly it is a principal object of the present invention to provide a new and improved process for separating solids suspended in aqueous media.

A further important object of the present invention is to provide a process employing newly discovered flocculating agents for agglomerating solids suspended in aqueous media and thereby enhance the filtration rate when separating solids from these aqueous media by filtration methods.

A further important object of the present invention is to provide a process employing newly discovered flocculating agents for agglomerating solids suspended in aqueous media and thereby enhance their separation rate when separating solids from these aqueous media by centrifuging methods.

A further important object of the present invention is to provide a process employing newly discovered flocculating agents for agglomerating solids suspended in aqueous media and thereby enhance their settling rate in thickening operations normally employed for separating the solids.

A further important object of the present invention is to provide a process employing newly discovered flocculating agents for agglomerating solids suspended in neutral, acid, or alkaline aqueous media or for clarifying such aqueous suspensions having a considerable portion of the suspended solids removed by a previous operation.

A further important object of the present invention is to provide a process employing newly discovered flocculating agents for agglomerating solids suspended in aqueous media wherein these flocculating agents may be used alone or in conjunction with other known flocculating agents.

These and other objects of the present invention will become more apparent after considering the following description of the present invention.

In accordance with the present invention, I have discovered that flocculation of solids suspended in aqueous media may be improved if the process employs a flocculating agent which is a water swellable water dispersible crossed-linked collagen derived organic nitrogenous colloidal substance of the protein class. In particular, I have found that a small amount of cross-linking, to the point of even slight gelation and partial insolubility in water is highly beneficial to the behavior of these flocculants. Even a relatively large amount of cross-linking which results in a product essentially insoluble in water but yet still swelled by water, gives rise to highly improved flocculants which afford massive, curdy, rapidly settling flocs which are highly amenable either to filtration, centrifuging or thickening and/or counter-current washing operations.

An added advantage these cross-linked materials offer is that it is difficult to use them in excess—e.g. the agglomerating action becomes greater the higher the concentration of agent used. This is in contrast with their essentially linear counterparts which begin to act as suspending agents if they are used in excess. Thus whereas a small amount of glue or gelatin will serve as as somewhat unsatisfactory agglomerating agent, the addition of an excess of glue or gelatin serves to resuspend the flocculated slimes and to keep them in suspension. The greater the cross-linking in the agents of this invention, the lesser the tendency to behave as a resuspending agent.

Examples of collagen derived organic nitrogenous colloidal substances of the protein class include glue, gelatin, water-soluble extractives from collagen-like materials, etc. When one or a mixture of these protein materials are treated as described hereinafter with cross-linking agents under different conditions even to the extent of almost complete gelation, they are dispersible in water and water swellable. Any crossed-linked protein material of the aforesaid type which is still water swellable and dispersible in water is satisfactory for the purposes of the present invention.

The reagents which may be used economically to effect linear growth, cross-linking, and a combination of the two processes can be illustrated by the following:

Aldehydes and dialdehydes such as formaldehyde, acetaldehyde, glyoxal and their homologs; mixed carbonyl compounds such as methyl glyoxal (pyruvic aldehyde) and its homologs; diketones as exemplified by diacetyl and its homologs. These function to effect crosslinking through Schiff type reactions with free amino groups in the protein chain or through reaction with amido groups possessing one or two hydrogens, serving to link one chain to another. The Schiff type reactions may be illustrated as follows:

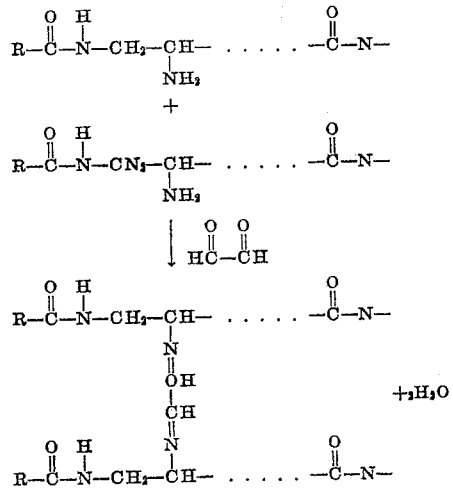

and these reactions may repeat to give a three dimensional structure.

Other reagents which may be employed are polycarboxylic acid anhydrides such as maleic anhydride, succinic anhydride, phthalic anhydride, itaconic anhydride, which will form new amide linkages across adjacent chains through reaction with the amino groups in a dry reaction. Polycarboxylic acid halides, such as the chlorides and bromides of the above named polybasic acids will undergo cross-linking reactions in the liquid phase in the presence of alkaline catalysts (Schotten-Baumann) to effect the desirable changes. Polyhydroxy alcohols, such as ethylene glycol, diethylene glycol, glycerol and pentaerythritol can likewise be caused to condense with the free carboxyl groups to effect cross-linking through ester formation.

The cross-linking reactions can conveniently be carried out either in one step or in two or more depending upon the final desired properties. Thus for example, a hide glue can be treated in a relatively concentrated solution with glyoxal to effect considerable cross-linking, or it may be treated initially with a dilute solution of glyoxal or formaldehyde or a mixture of the two to effect an initial linear growth, following which it may be more heavily cross-linked by the addition of larger quantities of cross-linking agents and further treatment. This procedure is particularly advantageous with the cheaper protein materials such as low grade glues, which become degraded in molecular size in the course of their production.

The linear growth and cross-linking reactions with glyoxal, pyruvic aldehyde, diacetyl, acetaldehyde and formaldehyde can be conveniently carried out at ambient temperature or at elevated temperature. With the more unreactive carbonyl compounds such as pyruvic aldehyde, diacetyl and acetaldehyde, it is advantageous to add small amounts of acidic catalyst such as ammonium chloride in order to accelerate the reaction, although the reaction proceeds without these catalysts to produce useful products if the reaction period is prolonged enough. The reactions proceed more rapidly at higher temperatures, but very satisfactory products can be prepared merely by mixing the solutions and allowing them to stand until fairly complete gelling has occurred. When cross-linking is carried out with polycarboxylic acids or polyalcohols, heating is required, preferably a bake of a homogeneously mixed product obtained by evaporating a solution of the reactants to dryness, preferably under vacuum to aid in the removal of water. Cross-linking by means of the Schotten-Baumann acylation with polybasic acid halides is conveniently carried out in either alkaline solution or in the presence of pyridine.

The amount of cross-linking can vary from a very slight amount (which nevertheless has pronounced beneficial effects) to heavy cross-linking which produces a relatively insoluble material. For each substance there is an optimum amount of cross-linking desirable, and this is a function of quantity of reagents, their overall concentration, the temperature at which the reaction is carried out, and the length of time the reaction proceeds. In all instances gelling of the material occurs to a greater or lesser extent, and the product does not disperse in water as easily as the starting material. It is desirable to stop the reaction after gelling has taken place (in the instance of a homogeneous reaction) and while the cross-linked material still shows considerable swelling on soaking in water. If it does not swell appreciably, then subsequent dispersion is poor and the material loses much of its effectiveness. The use of as little as 0.1% by weight of cross-linking agent based on the weight of protein material treated provides improved agents and as high as 25% by weight may be employed to produce improved agents of satisfactory dispersion properties.

The use of glyoxal in treating glue, gelatin and soluble cellulose derivatives to insolubilize them after drying, and enhance their function as sizing agents is well known in the art. However, the wholly insoluble materials are not useful as flocculating agents and the cross-linking reactions are better carried out in homogeneous solution rather than in a dry state.

After sufficient molecular growth and cross-linking have been achieved, the gelled product is allowed to swell in water and is then dispersed with a powerful cutting agitator such as a Waring Blendor and finally roughly homogenized in a colloid mill at desirable concentration levels (in the neighborhood of 0.5-2%). The solutions are not true solutions and are actually suspensions since careful examination reveals myriad visible swelled particles floating about.

The modified protein products which are produced through the reactions described in the examples below may be used along to good advantage as fluocculants for primary slimes (classifier overflow during a sand-slime separation), or on the raw agitated leach pulp without the intermediate classification step, or as a final clarifying treatment of a nearly clear pregnant liquor. These modified protein products may likewise be used to good advantage as fluocculants to agglomerate solids suspended in aqueous media such as are encountered in various industrial operations, and clarification of natural turbid waters. The flocculated particles may be either separated by settling in thickeners or clarification tanks, or by centrifuging, or they may be filtered in conventional filter operations.

In all instances a nearly sparkling liquor can be obtained. However, during the course of repulping or resuspension for washing in thickeners or in centrifuges, some resuspension of fine solids may occur in which event the use of additional small amounts of these modified flocculants is beneficial.

A very pronounced synergistic effect is observed when the materials prepared according to the examples below are used in conjunction with the carbohydrate-type anionic flocculants, or even with small amounts of glue or gelatin. The order of addition of reagents can be important, and it has been found that although a mixture of the reagents functons satisfactorily, if the reagents are added stepwise with agitation, the most satisfactory results are obtained if the polycationic material is added last. Otherwise a somewhat turbid liquor is produced.

The synergistic action is most pronounced with the cellulose derivatives such as carboxymethyl cellulose, methyl cellulose, hydroxyethel cellulose, and carboxymethyl hydroxyethyl cellulose; and almost equally striking when some of the natural gums, such guar gum or locust bean gum, or fractions of these gums are employed with my modified reagents. The overall effect is to produce massive, yet tight flocs which settle as rapidly as those formed when either the modified polycationic agents or the natural or synthetic polyanionic agents are used alone, but the supernatant liquor is in many instances of sparkling clarity. The best results can be obtained when a mixture of my modified proteins with carboxymethyl cellulose or methyl cellulose is used or when a mixture of my modified proteins with carboxymethyl cellulose or methyl cellulose and one of the above-mentioned gums is employed. Whereas the initial floc formation and settling rates are essentially the same in all instances, the pregnant liquor obtained is of the highest clarity, and more important, the underflow advance can be agitated relatively vigorously in the succeeding washing operations without incurring the resuspension of fine slimes. Thus in a thickener operation, it is possible to obtain an essentially clear overflow at all stages, so that no build-up of fine advanced slimes is incurred.

The use of the modified proteinaceous materials in admixture with unmodified glue or gelatin is similarly very advantageous in that the settling rate of the flocs is considerably enhanced over that obtainable from the use of glue alone, even in prohibitive amounts, and an essentially clear liquor is obtained. In fact the use of more than a well defined amount of glue (depending on the nature of the pulp being treated) is deleterious inasmuch as the excess behaves as a suspending agent. When a mixture of glue and modified protein is used, it is most beneficial that the latter be added last, and in somewhat greater quantity than the former.

The beneficial effect on filtration rates accruing from the use of modified protein-polyanionic flocculant mixtures is extremely pronounced. The flocculation may be carried out on the agitated pulp mixture or on the separated slimes. Fast filter rates, good cake pick-up, and prevention of cake breaking which ordinarily prevents washing of the cake in place, are the benefits resulting from the use of these mixtures. A mixture of glue and a cross-linked glue sample employed on an agitated acid pulp in quantities of less than a pound of reagent per ton of ore afforded filter rates that would allow operation of a 200 ton per day plant with less than 1,000 sq. ft. of filter area required. The cake did not crack and rapid complete washing of the entrapped liquors was effected. Through the use of modified proteins admixed with carboxymethyl cellulose or guar gum or locust bean gum or of a mixture of guar gum or locust bean gum with methyl cellulose or carboxymethyl cellulose, even better filter rates are obtainable and even agglomerated slimes can be readily filtered and washed.

The following examples illustrate the manner in which these modified proteins can be prepared to yield improved agglomerating agents. They are not meant to limit the scope of this invention, but only to illustrate what some of the possibilities are.

Examples I through XVIII which follow illustrate the preparation of the flocculating agents of the present invention:

Example I

Forty 1 gram samples of a hide glue of Consolidated Chemical Industries were dissolved, each in 5 ml. of water; a 1% solution of glyoxal was prepared by dissolving 6.66 g. of the 30% technical product in water and diluting to 200 ml. Varying quantities of glyoxal were added and the mixtures heated in a water bath maintained at 90–92°° C. for varying periods of time, or else taken to dryness by evaporation on a steam bath, following which a baking treatment was given the sample. After a few days the products were suspended in water, swelled, dispersed in a Waring Blendor and homogenized in a hand homogenizer after dilution to 200 ml. to afford a 0.5% suspension in water. The samples were stabilized against bacterial attack through the addition of a little cresol. The table below illustrates the conditions which were employed for the various samples.

| Sample Number | ml. 1% glyoxal added | Time of Heating at 90° C. | Time of Baking at 100° C., hr. |
|---|---|---|---|
| 1 | 1 | 15 min | |
| 2 | 1 | 30 min | |
| 3 | 1 | 60 min | |
| 4 | 1 | 2 hr | |
| 5 | 1 | 4 hr | |
| 6 | 1 | 36 hr | |
| 7 | 1 | 24 hr | 1 |
| 8 | 1 | 24 hr | 2 |
| 9 | 1 | 24 hr | 4 |
| 10 | 1 | 24 hr | 24 |
| 11 | 2 | 15 min | |
| 12 | 2 | 30 min | |
| 13 | 2 | 60 min | |
| 14 | 2 | 2 hr | |
| 15 | 2 | 4 hr | |
| 16 | 2 | 36 hr | |
| 17 | 2 | 24 hr | 1 |
| 18 | 2 | 24 hr | 2 |
| 19 | 2 | 24 hr | 4 |
| 20 | 2 | 24 hr | 24 |
| 21 | 5 | 15 min | |
| 22 | 5 | 30 min | |
| 23 | 5 | 60 min | |
| 24 | 5 | 2 hr | |
| 25 | 5 | 4 hr | |
| 26 | 5 | 36 hr | |
| 27 | 5 | 24 hr | 1 |
| 28 | 5 | 24 hr | 2 |
| 29 | 5 | 24 hr | 4 |
| 30 | 5 | 24 hr | 24 |
| 31 | 10 | 15 min | |
| 32 | 10 | 30 min | |
| 33 | 10 | 60 min | |
| 34 | 10 | 2 hr | |
| 35 | 10 | 4 hr | |
| 36 | 10 | 36 hr | |
| 37 | 10 | 24 hr | 1 |
| 38 | 10 | 24 hr | 2 |
| 39 | 10 | 24 hr | 4 |
| 40 | 10 | 24 hr | 24 |

Example II

Eight one-gram samples of edible gelatin were dissolved in 5 ml. water and to the warm solution, quantities of 1% glyoxal solution were added. After heating at 90–92° C. for varying periods of time the samples were cooled, swelled in water and dispersed and homogenized as in Example I.

| Sample Number | ml. 1% glyoxal added | Heating Period at 90–92° C. |
|---|---|---|
| 1-K-1 | 1 | 15 min. |
| 1-K-2 | 1 | 30 min. |
| 1-K-3 | 1 | 60 min. |
| 1-K-4 | 1 | 2 hr. |
| 2-K-1 | 2 | 15 min. |
| 2-K-2 | 2 | 30 min. |
| 2-K-3 | 2 | 60 min. |
| 2-K-4 | 2 | 2 hr. |

Example III

One-gram samples of glue were treated with varying quantities of glyoxal solution and heated for varying periods. Gelling occurred only after standing a few hours at room temperature after the heating period. The samples were then dispersed as in the previous examples.

| Sample Number | ml. glyoxal | Concentration Glyoxal Solution (Percent) | Heating Period at 90–92° C. |
|---|---|---|---|
| B-1 | 1 | 0.1 | 15 min. |
| B-2 | 1 | 0.1 | 30 min. |
| B-3 | 1 | 0.1 | 60 min. |
| B-4 | 1 | 0.1 | 2 hr. |
| B-5 | 1 | 0.1 | 4 hr. |
| C-1 | 1 | 0.01 | 15 min. |
| C-2 | 1 | 0.01 | 30 min. |
| C-3 | 1 | 0.01 | 60 min. |
| C-4 | 1 | 0.01 | 2 hr. |
| C-5 | 1 | 0.01 | 4 hr. |

Example IV

To 5 ml. of a 20% glue solution was added 1 ml. of 10% glyoxal. The mixture was heated for twenty minutes at 89° C. when it had gelled completely. It was no longer dispersible in water and showed a minimum of swelling. Its activity as a flocculant was poorer than that of the original glue indicating that it underwent too much cross-linking.

Example V

Four 5 ml. samples of a 20% glue solution were treated with 1 ml. of 0.1% glyoxal and heated at 90° for one hour. To each was then added varying amounts of 1% glyoxal, after which they were heated for an additional period. After brief standing at room temperature all samples had gelled. They were dispersed at 0.5% concentration.

| Sample Number | ml. 1% Glyoxal Added | Heating Period |
|---|---|---|
| 10-26-1 | 1 | 30 min. |
| 10-26-2 | 1 | 1 hr. |
| 10-26-3 | 2 | 30 min. |
| 10-26-4 | 2 | 1 hr. |

Example VI

Four 5 ml. samples of a 20% glue solution were treated with 1 ml. of 0.01% glyoxal and heated at 90° for one hour. To each was added varying amounts of 1% glyoxal, after which they were heated for an additional period. After brief standing at room temperature all samples had gelled. They were dispersed at 0.5% concentration.

| Sample Number | ml. 1% Glyoxal Added | Heating Period, min. |
|---|---|---|
| 10-26-5 | 1 | 30 |
| 10-26-6 | 1 | 60 |
| 10-26-7 | 2 | 30 |
| 10-26-8 | 2 | 60 |

*Example VII*

Six 5 ml. samples of a 20% glue solution were treated with 1 ml. of 0.1% glyoxal or 1 ml. of 0.01% glyoxal, and heated for one hour. After cooling, 3 ml. of 1% glyoxal was added to each sample, and the samples were given an additional heating treatment. All samples gelled during the first eight minutes of the second heating period. The products were dispersed at 0.5% concentration.

| Sample Number | Initial Glyoxal Concentration (Percent) | Final Heating Period |
|---|---|---|
| 58-2-7 | 0.1 | 30 min. |
| 58-2-9 | 0.1 | 60 min. |
| 58-2-11 | 0.1 | 2 hr. |
| 58-2-19 | 0.01 | 30 min. |
| 58-2-21 | 0.01 | 60 min. |
| 58-2-23 | 0.01 | 2 hr. |

*Example VIII*

Eight 5 ml. samples of 20% glue solution were treated with 1 ml. of 0.1% formaldehyde solution and heated one hour at 93° C. To each sample was then added varying amounts of 1% glyoxal solution, after which they were heated for an additional period of 93° C. All of the samples gelled during the second heating period or shortly after cooling.

| Sample Number | ml. 1% Glyoxal Added | Heating Period, hr. |
|---|---|---|
| 58-1-1 | 1 | 1 |
| 58-1-2 | 1 | 2 |
| 58-1-3 | 2 | 1 |
| 58-1-4 | 2 | 2 |
| 58-1-5 | 3 | 1 |
| 58-1-6 | 3 | 2 |
| 58-1-7 | 4 | 1 |
| 58-1-8 | 4 | 2 |

*Example IX*

Two 1 gram samples of glue were dissolved in water and treated with 2 ml. and 4 ml. of 1% ethylene glycol solution. The mixtures were evaporated to dryness and baked for 48 hours at 110° C. The products dispersed readily in water and were identified as samples EG-2 and EG-4.

*Example X*

Two 1 gram samples of glue were dissolved in water and treated with 2 ml. and 4 ml. of 1% aqueous maleic acid solution. The mixtures were evaporated to dryness and baked for 48 hours at 110° C. The products dispersed readily in water and were identified as samples MA-2 and MA-4.

*Example XI*

A 1 gram sample of glue was dissolved in 5 ml. of water and the solution was treated with three ml. of 1% solution of glyoxal. The mixture was allowed to stand at room temperature for sixteen hours, during which it had gelled completely. It was suspended in water at 0.5% concentration—sample 58-3-11.

Ten 5 ml. samples of a 20% glue solution were treated with varying quantities of a 1% formaldehyde solution and heated for various periods. All of the samples gelled during the first fifteen minutes of heating. The samples were dispersed in water at 0.5% concentration.

| Sample Number | ml. 1% Formaldehyde | Heating Period |
|---|---|---|
| 58-3-1 | 1 | 1 hr. |
| 58-3-3 | 2 | 1 hr. |
| 58-3-5 | 3 | 1 hr. |
| 58-3-7 | 4 | 1 hr. |
| 58-3-9 | 5 | 1 hr. |
| 58-3-10 | 5 | 15 min. |

*Example XIII*

A one gram sample of glue dissolved in five ml. of water was treated with 5 ml. of 1% acetaldehyde solution. Heating the mixture for an hour did not produce gelling. The sample was allowed to stand at room temperature for twelve days during which a slow gelling reaction continued and at the end of this time the rigid gel no longer liquefied when heated in a steam bath. The product was swelled in water and dispersed in the usual fashion. It exhibited much improved properties as a flocculating agent.

*Example XIV*

A one gram sample of glue dissolved in five ml. of water was treated with 20 mg. ammonium chloride and one ml. of 25% acetaldehyde was added. During a ten minute heating period at 95° C. rigid gelling occurred and the product required treatment in a blender to effect dispersion. It was a considerably improved flocculant.

*Example XV*

A one gram sample of glue dissolved in five ml. of water was treated with 25 mg. ammonium chloride and one ml. of 15% pyruvic aldehyde. During a 15 minute heating period the mixture formed a soft gel which was easily dispersed without blending. This product exhibited enhanced flocculant activity.

*Example XVI*

A one gram sample of gelatin was dissolved in five ml. of water containing 25 mg. ammonium chloride. One ml. of 15% diacetyl was added and in the course of a thirty minute period of heating, a soft gel, easily dispersible in water, was produced. The product exhibited enhanced flocculant activity.

*Example XVII*

A homogeneous solution was prepared containing one gram of glue, 4 ml. water and 1 ml. 10% aqueous glycerol. The solution was brought to dryness in a flask under vacuum by gentle heating. Then the flask was immersed in an oil bath maintained at 150° C. for 1½ hours, removal of water being aided by the vacuum. The product had obviously undergone considerable cross-linking inasmuch as it did not disperse on heating in water. After swelling, it was adequately dispersed by blending and showed improved flocculating activity.

For the purpose of testing samples prepared above for activity as flocculants, several slimes suspensions were prepared as follows:

(a) An ore ground to pass 10 mesh was leached with dilute sulfuric acid at 50% solids by agitating for four hours. The sands were allowed to settle for one minute, when the slimes were decanted. The residual sands were repulped in four stages with enough dilute acid to afford, after settling and decantation of slimes, a volume of slimes equal to that obtained after the initial agitation and settling period. The pregnant liquor-slimes mixture contained 8% of solids as slimes.

(b) A portion of sample (a) slimes was treated with a dilute solution of guar gum to flocculate type I slimes and the turbid supernatant liquor was decanted to afford a sample of type II slimes at 0.6% solids, which was diluted with clarified liquor to 0.1% solids.

(c) A portion of sample (b) was treated with sufficient glue solution to achieve a slow settling and clarification of liquor. The tiny flocs of suspended material settled slowly to afford a thickened underflow at 6% solids. This underflow liquor with its suspended material was kept for several days until the glue had hydrolyzed and lost its flocculating activity. The settled slimes were then used as sample (c) for testing purposes.

A raw ore pulp sample in water was subjected to attrition grinding after which a sand-slime separation was carried out in a centriclone machine to afford a minus 325 mesh neutral slime sample which was diluted to 1.5% solids for testing.

The following examples illustrate actual tests as carried out using the agents prepared in Examples I through XVII above.

Example XVIII

For examining the flocculating efficiency of various of the prepared samples the following test was devised: two drops of slime solution (c) were placed in the well of a microscope slide, and a drop of the reagent being tested (at 0.5% concentration). The drops were stirred together with a fine stirrer for 10 seconds and the size of the agglomerated particles compared and rated visually from 1 to 5 as the size of the flocs increased. As standards were used untreated glue which gives very tiny flocs, rated 1; edible gelatin gives somewhat larger flocs rated 2; sample 3 of Example I gives still larger flocs, rated 3; a sample of modified gelatin (1–K–2 of Example II) afforded still larger flocs and was rated 4.

| Sample Number | Rating | Sample Number | Rating | Sample Number | Rating |
|---|---|---|---|---|---|
| 1 | 3.5 | 11 | 3.8 | 21 | 4 |
| 2 | 3 | 12 | 4.2–4.5 | 24 | 3.8–4.0 |
| 3 | 3 | 13 | 4 | 25 | 2.0 |
| 4 | 4.4 | 14 | 3.8 | 31 | 4.5–4.8 |
| 5 | 3.8–3.9 | 15 | 3.5 | 32 | 4.1 |
| 6 | 3 | 16 | 3.0 | 33 | 4.0 |
| 7 | 3.5 | 17 | 3.9 | 34 | 3.8 |
| 8 | 3.5 | 18 | 2.5 | | |

All of the samples showed enhanced activity over that of the untreated glue although a combination of an excess of glyoxal for prolonged periods causes the flocculating activity to drop off. Even at very low concentrations, e.g. concentrations that will just produce gelling, an improved material is obtained.

Example XIX

A second test was devised employing slime sample (b) wherein 10 ml. of the slimes in a 10 ml. graduate were treated with 4 drops of reagent (0.5% concentration) being tested, the graduate stoppered and inverted five times. The general size of flocs produced was estimated and the observation made of the settling time required to afford 4 ml. of clear supernatant liquor and 6 ml. of clear supernatant liquor.

| Sample Number | Floc Size [1] | Time to 4 ml. Clear Liquor | Time to 6 ml. Clear Liquor |
|---|---|---|---|
| Glue | S | 5'22" | 5'50" |
| 3 | M | 1'53" | 2'25" |
| 4 | M | 1'46" | 2'12" |
| 5 | S–M | 1'50" | 2'20" |
| Product of Example XIII | M–L | 1'05" | 1'21" |
| 12 | M–L | 1'34" | 1'55" |
| 27 | S | 2'40" | 3'15" |
| 31 | M–L | 1'0" | 1'20" |
| 37 | M | 2'0" | 2'32" |
| Product of Example IV | Unflocculated | | |
| 1–K–3 | M | 1'35" | 2'04" |
| 1–K–4 | M | 1'40" | 1'57" |
| 2–K–1 | S | 4'0" | 4'30" |
| 2–K–2 | S | 4'05" | 4'15" |
| 2–K–3 | S | 4'45" | 5'30" |
| 2–K–4 | S | >6' | |
| 10–26–1 | S–M | 2'55" | 3'32" |
| 10–26–3 | S–M | 1'48" | 2'00" |
| 10–26–4 | L | 1'21" | 1'34" |
| 10–26–5 | S | 3'05" | 3'40" |
| 10–26–7 | M | 1'53" | 2'30" |
| 10–26–8 | M–L | 1'18" | 1'53" |
| 58–2–8 | L | 0'58" | 1'05" |
| 58–2–10 | L | 1'05" | 1'30" |
| 58–2–12 | L | 1'13" | 1'32" |
| Product of Example XV | M | 1'36" | 2'02" |
| 58–2–20 | L | 0'51" | 1'04" |
| 58–2–22 | L | 1'05" | 1'15" |
| 58–2–24 | L | 1'05" | 1'22" |
| EG–2 | S | 3'15" | 3'50" |
| EG–4 | S | 3'30" | 4'10" |
| MA–2 | S | 3'30" | 4'10" |
| MA–4 | S | 3'05" | 3'50" |
| 58–1–3 | M–L | 0'59" | 1'14" |
| 58–1–5 | M–L | 1'03" | 1'20" |
| 58–1–7 | M–L | 1'18" | 1'36" |
| 58–3–1 | M–L | 2'05" | 2'35" |
| 58–3–3 | L | 1'08" | 1'20" |
| 58–3–5 | M–L | 1'18" | 1'39" |
| 58–3–7 | M–L | 1'16" | 1'40" |
| 58–3–9 | L | 1'01" | 1'22" |
| 58–3–10 | L | 1'03" | 1'25" |

[1] S—small; M—medium; L—large.

Example XX

Two 100 ml. samples of slimes (a) were treated with two 5 ml. portions of glue and sample 58–1–3 respectively. After inversion several times the settling rate was observed. The flocs formed by sample 58–1–3 were curdy and very large compared with those produced by unmodified glue.

| Time | Slime Bed Ht. (ml.) 58–1–3 | Slime Bed Height (ml.) Unmodified Glue |
|---|---|---|
| 0'45" | 100 | 110 |
| 1'42" | 90 | 108 |
| 2'36" | 80 | 107 |
| 3'33" | 70 | 106 |
| 6'0" | 60 | 103 |
| 8'0" | 58 | 100 |

Thus the settling rate on primary slimes is considerably enhanced through the use of modified materials. The supernatant liquid, furthermore, was of greater clarity in the sample treated with cross-linked reagent.

Example XXI

Two 25 ml. samples of slimes (a) were each treated with 0.5 ml. of 0.5% guar gum, and with 0.5 ml. of sample 31 (Example I), and 0.5 ml. of unmodified glue, respectively. The settling rates were observed and it was noted that the flocs in the sample treated with cross-linked reagent were larger and curdier than those produced by the untreated glue.

| Time | Slime Height (ml.) Sample 31 | Slime Height (ml.) Unmodified Glue |
|---|---|---|
| 0'35" | 23 | 26 |
| 2' | 20 | 25.5 |
| 3' | 17.5 | 25 |
| 4' | 16 | 24.5 |
| 5' | 15 | 24 |
| 7' | 14 | 23 |

Example XXII

Two 25 ml. samples of slimes (a) were treated as in Example XVI except that 0.75 ml. of all reagents was used.

| Time | Slime Height (ml.) Sample 31 | Slime Height (ml.) Unmodified Glue |
|---|---|---|
| 1'0" | 21.5 | 26 |
| 2' | 16.5 | 26 |
| 3' | 14.5 | 25.5 |
| 4' | 13.5 | 25 |
| 5' | 13 | 25 |
| 6' | 12.5 | 24.5 |

Thus in 5 minutes the slimes treated with modified reagent had settled to 50% of the original volume whereas the sample treated with unmodified glue had afforded a clear liquor equivalent to only 4% of the original volume.

Example XXIII

To illustrate the effect of the cross-linked polycationic flocculant on filtration of primary slimes, two 25 ml. samples of slimes (a) were each treated with 1 ml. of 0.5% guar gum and with 1 ml. of sample 58–2–20 and unmodified glue respectively. The samples were filtered on a 2" Büchner funnel.

| Samples | Time to Filter to Dry Cake |
|---|---|
| (1) Untreated | 14'15" |
| (2) Guar and Glue | 4'45" |
| (3) Guar and 58–2–20 | 1'50" |

Example XXIV

To examine clarity of supernatant liquor from the settling of slimes, and resistance to resuspension of fines upon washing of slimes, samples of slimes (a) were treated with various combinations of reagents, allowed to settle, and the supernatant liquor examined. After standing overnight, the liquor was decanted and the settled slimes repulped in water and allowed to settle briefly.

| Volume Slimes | Mixture of Reagents [1] | Flocculating | Settling | Supernatant Liquor | Liquor from Repulped Slimes |
|---|---|---|---|---|---|
| 25 ml | 1 ml. guar<br>1 ml. CMC [2]<br>1 ml. glue | Excellent | Excellent | Slight Haze | Clear. |
| 25 ml | 1 ml. 58–2–19<br>2 ml. CMC<br>2 ml. 58–2–19 | Very good | Good | do | Do. |
| 25 ml | 1 ml. guar<br>1 ml. 58–2–19 | Excellent | Excellent | do | Slight Haze. |
| 25 ml | 1 ml. guar<br>1 ml. CMC<br>2 ml. 58–2–20 | do | do | do | Clear. |
| 25 ml | 1 ml. guar<br>1 ml. CMC<br>2 ml. glue | Small Flocs | Very slow | do | Clear after slow settling. |
| 100 ml | 2 ml. guar<br>2 ml. 58–2–19 | Big flocs | Rapid | do | Slight Haze. |
| 100 ml | 1 ml. guar<br>1 ml. 58–2–20 | do | do | Hazy | Do. |
| 100 ml | 1 ml. guar<br>2 ml. 58–2–20 | do | do | Slight Haze | Do. |
| 100 ml | 1 ml. guar<br>1 ml. CMC<br>2 ml. 58–2–20 | do | do | do | Clear. |

[1] All reagents were 0.5% concentration, except CMC, which was at 0.2% concentration.
[2] CMC is carboxymethyl cellulose.

Thus the synergistic activity of a little CMC mixed with the cross-linked polycationic material is demonstrated, in particular in the resuspension and washing of the floced slimes. The enhanced settling rate resulting from the use of cross-linked material over that resulting from the use of unmodified glue is illustrated in Examples XXI and XXII above.

Example XXV

The synergistic activity of guar gum with cross-linked polycationic materials was demonstrated as follows:

A 100 ml. sample of slimes (a) was flocculated with 5 ml. of guar gum. The flocs were intermediate in size and settling was rapid. The supernatant liquor, however, was quite turbid. Fifty ml. was decanted and the suspended solids collected and weighed: 0.380 gram or 0.76% solids.

A similar 100 ml. sample of slimes was flocculated with reagent 58–2–19 (5 ml.). The flocs formed were essentially of the same size as those formed by guar gum. Settling was slower however, and 9 minutes were required to afford 50 ml. of clear liquor. This liquor however, contained practically no suspended solids (less than 1 mg. per 50 ml.).

A third sample of 100 ml. of slimes (a) was flocculated with 2.5 ml. of guar gum (medium sized flocs) followed by 2.5 ml. of sample 58–2–19. Massive flocs formed immediately and settled to less than 50 ml. volume in just under 5 minutes. The supernatant liquor again was almost sparkling and contained less than 1 mg. of suspended solids per 50 ml. It is important that the two reagents either be mixed together for treatment, or that the gum be added before the cross-linked polycationic flocculant. Reversal of addition achieves much less satisfactory results and the supernatant liquor will be somewhat turbid.

Example XXVI

The procedure of Example XXV was repeated except that a solution of locust bean gum was substituted for the guar gum. The results obtained were essentially the same as those in Example XXV, except that the locust gum was not quite as effective as the guar.

Example XXVII

The effectiveness of the modified proteinaceous materials in the flocculating of a neutral slimes suspension was determined in the following manner: 100 ml. samples of neutral slimes (d) were treated with varying quantities of different reagents and the settling rates were observed (all reagents at 0.5% concentration).

| Time, min. | SLIME BED HEIGHT (ML.) | | | | | |
|---|---|---|---|---|---|---|
| | Glue | | 58–3–10 | | 0.5 ml. guar +1 ml. glue | 0.5 ml. guar +1 ml. 58–3–10 |
| | 2 ml. | 1 ml. | 2 ml. | 1 ml. | | |
| 1 | 101 | 101 | 97 | 99 | 98 | 56 |
| 2 | 101 | 100 | 95 | 99 | 87 | 45 |
| 3 | 101 | 100 | 87 | 98 | 74 | 40 |
| 4 | 100+ | 100 | 76 | 98 | 64 | 37 |
| 5 | 100 | 100 | 69 | 97 | 58 | 35 |
| 6 | 100 | 100 | 63 | 97 | | |
| 7 | 100 | 100 | 58 | 96 | | |
| 8 | 100 | 99 | 54 | 95 | | |
| 10 | 100 | 97 | 49 | 91 | | |
| 15 | 99 | 89 | 42 | 73 | | |

Example XXVIII

To demonstrate the effectiveness of the cross-linked glue as a flocculant in alkaline medium, 400 ml. of slimes (d) was treated with 10 ml. of 5% NaOH solution. The pH was well in excess of 12. 100 ml. samples were treated with varying quantities of modified and unmodified glue (0.5%) and the settling rates observed.

SLIME BED HEIGHT (ML.)

| Time (min.) | Sample 58-3-10 | | Unmodified Glue | |
|---|---|---|---|---|
| | 2 ml. | 1 ml. | 2 ml. | 1 ml. |
| 1 | 63 | 95 | 100 | 100 |
| 2 | 49 | 80 | 100 | 100 |
| 3 | 43 | 68 | 100 | 99.5 |
| 4 | 40 | 66 | 100 | 99 |
| 5 | 38 | 54 | 99+ | 99 |
| 10 | | | 97 | 97 |
| 12 | | | 91 | 92 |

*Example XXIX*

To demonstrate further the effectiveness of my modified proteinaceous material as aids for filtration, 100 ml. samples of slimes (a) were stirred and treated with various amounts and combinations of flocculating agents. After the flocculants had been added, the pulp was stirred for an additional minute and filtered on a 5.5 cm. Büchner funnel. Times were observed for filtration of 25, 50, and 75 ml. of clear liquor and dry cake time (sucking air) was also observed. All reagents were at 0.5 concentration except for the guar-CMC combination which was prepared from four volumes 0.5% guar and one volume of 0.2% high viscosity CMC. When combinations of agents were used, the cationic material was added last.

| Flocculant | Time to filter | | | |
|---|---|---|---|---|
| | 25 ml. | 50 ml. | 75 ml. | Dry cake |
| A | | | | |
| 1 ml. glue | 1'45" | 6'0" | 12'45" | 17'18" |
| 2 ml. glue | 1'25" | 5'05" | | 16'15" |
| 3 ml. glue | 1'05" | 4'0" | 8'17" | 12'56" |
| 5 ml. glue | 0'53" | 3'20" | 6'45" | 10'51" |
| B | | | | |
| 1 ml. 58-3-10 | 1'33" | 5'25" | 11'35" | 17'14" |
| 2 ml. 58-3-10 | 0'46" | 2'45" | 6'25" | 9'40" |
| 3 ml. 58-3-10 | 0'32" | 2'04" | 4'36" | 5'05" |
| 5 ml. 58-3-10 | 0'20" | 1'15" | 2'35" | 4'25" |
| C | | | | |
| 1 ml. guar | 1'35" | 6'30" | 13'36" | |
| D | | | | |
| 1 ml. G.C.[1] | 1'12" | 5'07" | 11'35" | 17'10" |
| 2 ml. G.C.[1] | 1'10" | 4'53" | 11'04" | 17'0" |
| 3 ml. G.C.[1] | 1'25" | 5'45" | 12'0" | 18'23" |
| E | | | | |
| 1 ml. guar / 1 ml. glue | 1'17" | 5'25" | 11'20" | 18'0" |
| 2 ml. guar / 2 ml. glue | 1'05" | 4'23" | 9'30" | 17'0" |
| 3 ml. guar / 3 ml. glue | 1'25" | 5'43" | 12'15" | 19'0" |
| F | | | | |
| 1 ml. guar / 1 ml. 58-3-10 | 0'57" | 3'55" | 8'07" | 11'36" |
| G | | | | |
| 1 ml. guar / ½ ml. glue / 1 ml. 58-3-10 | 0'37" | 3'43" | 5'30" | 8'05" |
| 2 ml. guar / ½ ml. glue / 2 ml. 58-3-10 | 0'24" | 1'25" | 3'25" | 5'0" |
| H | | | | |
| 1 ml. G.C.[1] / 1 ml. 58-3-10 | 0'40" | 2'30" | 5'30" | 8'30" |
| 2 ml. G.C.[1] / 2 ml. 58-3-10 | 0'12" | 0'56" | 2'07" | 3'26" |
| I | | | | |
| 1 ml. G.C.[1] / ½ ml. glue / 1 ml. 58-3-10 | 0'20" | 1'35" | 4'0" | 6'15" |
| 2 ml. G.C.[1] / ½ ml. glue / 2 ml. 58-3-10 | 0'10" | 0'54" | 2'10" | 3'40" |

[1] Guar-CMC mixture.

Examples A and B demonstrate the marked superiority of the cross-linked product over unmodified glue, when both are used alone.

Example D illustrates that the guar-CMC mixture does not become more effective with increasing concentration. Examples E and F illustrate the superiority of the cross-linked proteinaceous material when used in combination with guar over that of unmodified glue in the same combination.

Examples F and G illustrate the synergism existing between modified glue, in combination with a small amount of unmodified glue and with guar.

The synergistic behavior of small amounts of unmodified glue with cross-linked glue and the guar-CMC mixture is illustrated in Examples H and I.

The foregoing description of the present invention is for the purpose of illustrating the present invention and is not limiting to the scope thereof which is set forth in the claims.

I claim:

1. The process of flocculating solids suspended in an aqueous medium which comprises the step of treating the aqueous medium with a dilute suspension of a flocculating agent comprising a water swellable and dispersible cross-linked collagen derived organic nitrogenous colloidal substance of the protein class.

2. The process of flocculating solids suspended in an aqueous medium which comprises the step of treating the aqueous medium with a dilute suspension of a flocculating agent comprising a water swellable and dispersible carbonyl cross-linked collagen derived organic nitrogenous colloidal substance of the protein class.

3. The process of flocculating solids suspended in an aqueous medium which comprises the step of treating the aqueous medium with a dilute suspension of a flocculating agent comprising a water swellable and dispersible aliphatic aldehyde cross-linked collagen derived organic nitrogenous colloidal substance of the protein class.

4. The process of flocculating solids suspended in an aqueous medium which comprises the step of treating the aqueous medium with a dilute suspension of a flocculating agent comprising a water swellable and dispersible formaldehyde cross-linked collagen derived organic nitrogenous colloidal substance of the protein class.

5. The process of flocculating solids suspended in an aqueous medium which comprises the step of treating the aqueous medium with a dilute suspension of a flocculating agent comprising a water swellable and dispersible glyoxal cross-linked collagen derived organic nitrogenous colloidal substance of the protein class.

6. The process of flocculating solids suspended in an aqueous medium which comprises the step of treating the aqueous medium with a dilute suspension of a flocculating agent comprising a water swellable and dispersible polycarboxylic acid anhydride cross-linked collagen derived organic nitrogenous colloidal substance of the protein class.

7. The process of flocculating solids suspended in an aqueous medium which comprises the step of treating the aqueous medium with a dilute suspension of a flocculating agent comprising a water swellable and dispersible polycarboxylic acid cross-linked collagen derived organic nitrogenous colloidal substance of the protein class.

8. The process of flocculating solids suspended in an aqueous medium which comprises the step of treating the aqueous medium with a dilute suspension of a flocculating agent comprising a water swellable and dispersible pyruvic aldehyde cross-linked collagen derived organic nitrogenous colloidal substance of the protein class.

9. The process of flocculating solids suspended in an aqueous medium which comprises the step of treating the aqueous medium with a dilute suspension of a flocculating agent comprising a water swellable and dispersible acetaldehyde cross-linked collagen derived organic nitrogenous colloidal substance of the protein class.

10. The process of flocculating solids suspended in an aqueous medium which comprises the step of treating the aqueous medium with a dilute suspension of a flocculating agent comprising a water swellable and dispersible maleic anhydride cross-linked collagen derived organic nitrogenous collodial substance of the protein class.

11. The process of flocculating solids suspended in an aqueous medium which comprises the step of treating the aqueous medium with a dilute suspension of a flocculating agent comprising a water swellable and dispersible polyhydroxyalcohol cross-linked collagen derived organic nitrogenous colloidal substance of the protein class.

12. The process of flocculating solids suspended in an aqueous medium which comprises the step of treating the aqueous medium with a dilute suspension of a flocculating agent comprising a water swellable and dispersible glycerol cross-linked collagen derived organic nitrogenous colloidal substance of the protein class.

13. The process of flocculating solids suspended in an aqueous medium which comprises the step of treating the aqueous medium with a dilute suspension of a flocculating agent comprising a water swellable and dispersible ethylene glycol cross-linked collagen derived organic nitrogenous colloidal substance of the protein class.

14. The process of flocculating solids suspended in an aqueous medium which comprises the step of treating the aqueous medium with a dilute suspension of a flocculating agent comprising a water swellable and dispersible cross-linked collagen derived organic nitrogenous colloidal substance of the protein class, the organic nitrogenous colloidal substance of the protein class being cross-linked with from 0.1 to 25% by weight of a cross-linking agent based on the weight of the organic nitrogenous colloidal substance of the protein class.

15. The process of flocculating solids suspended in an acid aqueous medium which comprises the step of treating the aqueous medium with a dilute suspension of a flocculating agent comprising a water swellable and dispersible cross-linked collagen derived organic nitrogenous colloidal substance of the protein class.

16. The process of flocculating solids suspended in a neutral aqueous medium which comprises the step of treating the aqueous medium with a dilute suspension of a flocculating agent comprising a water swellable and dispersible cross-linked collagen derived organic nitrogenous colloidal substance of the protein class.

17. The process of flocculating solids suspended in an alkaline aqueous medium which comprises the step of treating the aqueous medium with a dilute suspension of a flocculating agent comprising a water swellable and dispersible cross-linked collagen derived organic nitrogenous colloidal substance of the protein class.

18. The process of flocculating solids suspended in an aqueous medium which comprises treating the aqueous medium with a dilute suspension of a water swellable and dispersible cross-linked collagen derived organic nitrogenous colloidal substance of the protein class and guar gum, the aqueous medium being treated with the guar gum at the time of treatment with the cross-linked collagen derived organic nitrogenous colloidal substance of the protein class.

19. The process of flocculating solids suspended in an aqueous medium which comprises treating the aqueous medium with a dilute suspension of a water swellable and dispersible cross-linked collagen derived organic nitrogenous colloidal substance of the protein class and carboxymethyl cellulose, the aqueous medium being treated with the carboxymethyl cellulose at the time of treatment with the cross-linked collagen derived organic nitrogenous colloidal substance of the protein class.

20. The process of flocculating solids suspended in an aqueous medium which comprises treating the aqueous medium with a dilute suspension of a water swellable and dispersible cross-linked collagen derived organic nitrogenous colloidal substance of the protein class and a glue substantially free of induced cross-linking, the aqueous medium being treated with the blue at the time of treatment with the cross-linked collagen derived organic nitrogenous colloidal substance of the protein class.

21. The process of flocculating solids suspended in an aqueous medium which comprises treating the aqueous medium with a dilute suspension of a water swellable and dispersible cross-linked collagen derived organic nitrogenous colloidal substance of the protein class and a gelatin substantially free of induced cross-linking, the aqueous medium being treated with the gelatin at the time of treatment with the cross-linked collagen derived organic nitrogenous colloidal substance of the protein class.

22. The process of flocculating solids suspended in an aqueous medium which comprises treating the aqueous medium with a dilute suspension of a water swellable and dispersible formaldehyde cross-linked collagen derived organic nitrogenous colloidal substance of the protein class and guar gum.

23. The process of flocculating solids suspended in an aqueous medium which comprises the step of treating the aqueous medium with a flocculating agent comprising a water swellable and dispersible cross-linked collagen derived organic nitrogenous colloidal substance of the protein class.

References Cited in the file of this patent

UNITED STATES PATENTS

| 898,866 | Garin et al. | Sept. 15, 1908 |
|---|---|---|
| 1,545,318 | Herbden | July 7, 1925 |
| 2,358,055 | Cahn | Sept. 12, 1944 |
| 2,403,144 | Tutt et al. | July 2, 1946 |
| 2,471,474 | Alba et al. | May 31, 1949 |
| 2,591,133 | Campbell | Apr. 1, 1952 |

FOREIGN PATENTS

| 700,220 | Great Britain | Nov. 25, 1933 |
|---|---|---|
| 703,964 | Great Britain | Feb. 10, 1954 |
| 176,184 | Austria | Sept. 25, 1953 |

UNITED STATES PATENT OFFICE

CERTIFICATE OF CORRECTION

May 17, 1960

Patent No. 2,937,143

Mayer B. Goren

It is hereby certified that error appears in the printed specification of the above numbered patent requiring correction and that the said Letters Patent should read as corrected below.

Column 3, lines 44 and 45, for "fluocculating" read -- flocculating --; column 9, between lines 72 and 73, insert -- Example XII -- in italics as a heading to the following paragraph; column 18, line 18, for "blue" read -- glue --.

Signed and sealed this 1st day of November 1960.

(SEAL)
Attest:
KARL H. AXLINE
Attesting Officer

ROBERT C. WATSON
Commissioner of Patents